United States Patent [19]

Bartling

[11] Patent Number: 5,000,086
[45] Date of Patent: Mar. 19, 1991

[54] METHOD FOR APPLYING A LIQUID RELEASE AGENT ON A CHEESE

[75] Inventor: Heinrich Bartling, Schwarmstedt, Fed. Rep. of Germany

[73] Assignee: Kraft General Foods, Inc., Glenview, Ill.

[21] Appl. No.: 305,523

[22] Filed: Feb. 2, 1989

[30] Foreign Application Priority Data

Feb. 2, 1988 [DE] Fed. Rep. of Germany ....... 3803756

[51] Int. Cl.⁵ .................... A01J 25/00; A23C 19/00
[52] U.S. Cl. ........................... 99/455; 99/462; 99/464; 99/466; 99/517; 118/24; 118/259
[58] Field of Search ................. 99/516, 517, 534, 535, 99/536, 452, 453, 455, 460, 464, 461, 462, 466; 426/582; 118/20, 258, 259

[56] References Cited

U.S. PATENT DOCUMENTS

| | | | |
|---|---|---|---|
| 1,056,719 | 3/1913 | Swenarton | 99/466 |
| 3,554,113 | 1/1971 | Page | 99/534 |
| 3,887,719 | 6/1975 | Miller | 99/464 |
| 3,900,574 | 8/1975 | Warwick | 426/582 |
| 4,156,384 | 5/1979 | Hinds, Jr. et al. | 426/582 |
| 4,206,696 | 6/1980 | Grant et al. | 99/464 |
| 4,416,201 | 11/1983 | Kessler | 118/259 |
| 4,538,541 | 9/1985 | Zimmer | 118/259 |
| 4,658,708 | 4/1987 | Rastoin | 118/24 |
| 4,665,811 | 5/1987 | Meyer | 99/535 |
| 4,735,817 | 4/1988 | Smith | 99/466 |

FOREIGN PATENT DOCUMENTS

1297263 5/1962 France ................. 99/464

*Primary Examiner*—Timothy F. Simone
*Attorney, Agent, or Firm*—Fitch, Even, Tabin & Flannery

[57] ABSTRACT

This invention concerns a process for applying a liquid release agent, especially an alginate, to the outside of a thin wide strand of cheese (30) on a revolving cooling roll (2) characterized in that the release agent is pressed onto the outside of the cheese strand (30) in the form of a film (34) which is fed at the rate of travel of the cheese strand (30).

6 Claims, 2 Drawing Sheets

METHOD FOR APPLYING A LIQUID RELEASE AGENT ON A CHEESE

BACKGROUND OF THE INVENTION

This invention concerns a process according to the definition of species of claim 1 and a device for carrying out the process.

Such a release agent is applied in order to prevent sticking of stacked slices of cheese cut from the cheese strand without inserting dividing paper in between.

It is known that release agents can be sprayed on the cheese strands. In doing so, the release agent is atomized and a portion of the atomized release agent is emitted to the environment where it settles in an undesirable manner and forms a nutrient substrate for bacteria.

SUMMARY OF THE INVENTION

The purpose of the invention is to avoid atomization of the release agent and to apply said release agent completely to the outside of the cheese strand.

The solution to this problem is given by applying a liquid release agent, particularly an alginate, onto the outside of a thin cooling roller, where the releasing agent is pressed to the outside of a string of cheese in the form of a film. The apparatus can be further defined in that in-between the distribution tube and the cooling roller, there is a distributor for the release agent. The releasing agent flows from the distributor onto the distributing roll, whereupon contact is made between the release agent and the cheese.

It has proven especially expedient to carry out the process at 70° to 90° C., preferably at 80° C. because the release agent can be processed best at the temperatures given there and bacteriological reinfection can be prevented.

To produce the film of release agent which is pressed onto the outside of the cheese strand, a device which contains an applicator roll, a cooling roll and a distribution tube (6), which resiliently presses the cheese between the applicator roll and the cooling roll, has proven especially successful.

In order to achieve an especially uniform distribution of the release agent on the applicator roll, preferably between the distribution tube and the cooling roller is disposed a distributor. The release agent flows from the distributor tube onto the applicator roll. By providing a distributor, an uneven distribution of release agent on the applicator roll is especially avoided by supplying the release agent only in the area of the discharge outlets, especially when using a viscous release agent.

An especially simple version of this distribution system is when the distributor functions as the distributor roll.

In order to avoid bacteriological reinfection by cold release agent on the applicator roll, a version an apparatus that has a stripper located in front of the distributor tube (6) in the direction of movement of the periphery of the applicator roll (4) and adjustable relative to the applicator roll (4) is preferred.

In order to be able to adjust the thickness of the film of release agent applied to the outside of the cheese strand, the applicator roll, distributor tube and optionally distributor as well as stripper are supported at or attached to a base support which is pressured against the cooling roll under adjustable spring pressure.

In order to be able to clean and optionally repair the apparatus easily during pauses in operation, the apparatus with a base support (12) disposed on a carriage (20), which is adjustably movable on a frame (22) in the direction of the cooling roller and away therefrom is particularly helpful. This version also permits start up of production as long as said cheese strand is not yet in complete contact with the cooling roll.

This invention will now be described in greater detail below on the basis of two practical examples with reference to the accompanying figures.

BRIEF DESCRIPTION OF THE DRAWINGS

Similar components are designated with the same reference numbers.

DETAILED DESCRIPTION OF THE PREFERRED EMBODIMENTS

Figure 1:
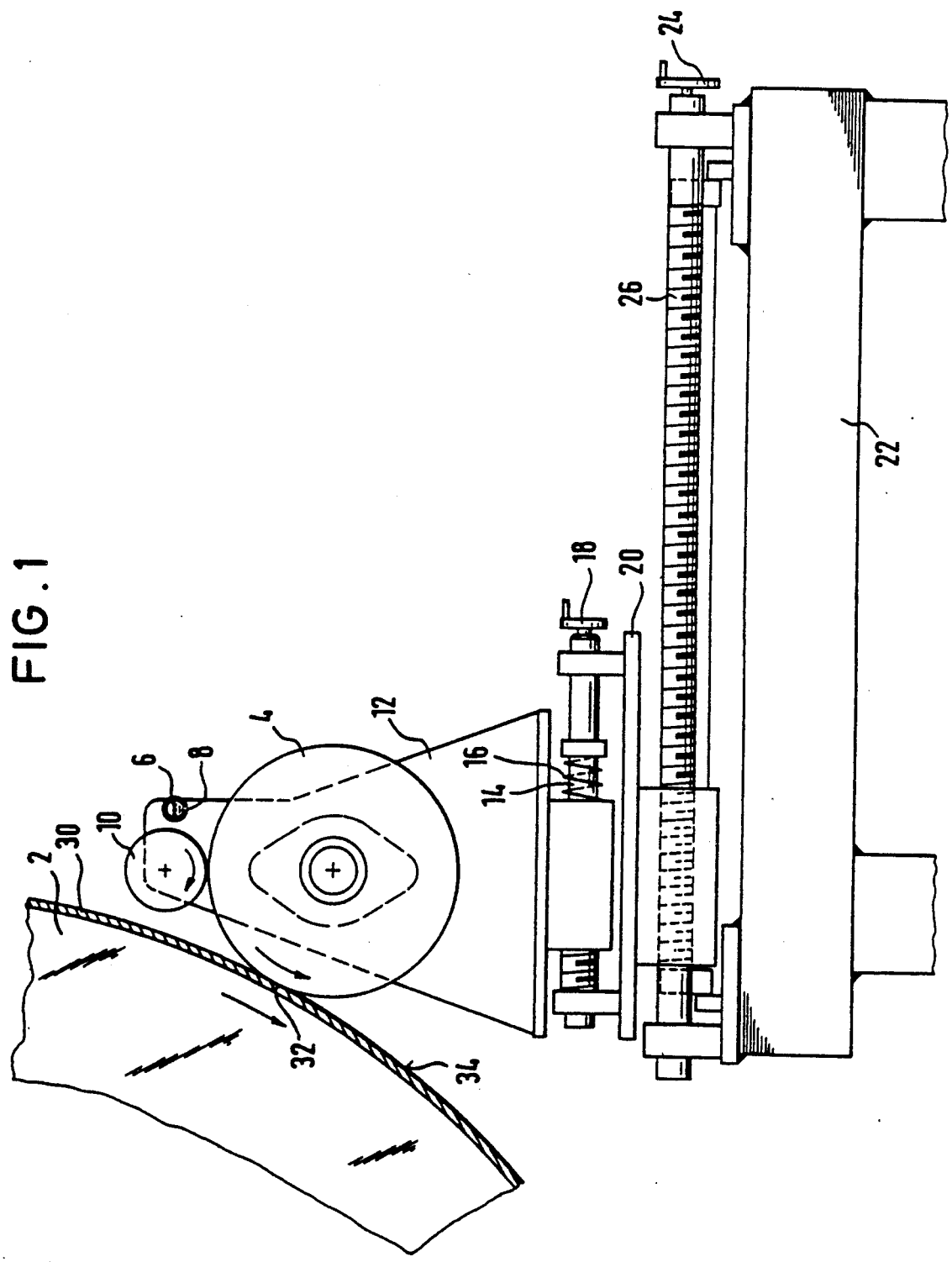
FIG. 1 shows schematically a detail of the cooling roll and, likewise schematically, the apparatus, each in side view, in a first version.

The apparatus according to FIG. 1 has an applicator roll for the release agent which is pressed against a cooling roll (2). Above the applicator roll (4) there is a distributor tube (6) for the release agent extending in longitudinal direction along the applicator roll (4). Said distributor tube (6) has a row of outlet bores (8) for the release agent pointing downward.

Above applicator roll (4) and between distributor tube (6) and cooling roll (2) there is a distributor roll (10) for the release agent which leaves distributor tube (6) and travels to applicator roll (4).

Applicator roll (4), distributor tube (6) and distributor roll (10) are each mounted on or attached to a base support (12) which can move along a guide (14) in the direction of cooling roll (2) and away from it. Base support (12) and thus applicator roll (4) can be pressed with a spring action against cooling roll (2) by means of a spring (16) whose compression can be adjusted with precision by a hand lever (18).

Base support (12) is in turn mounted on carriage (20) which can move on a frame (22) in the direction of cooling roll (2) and away from cooling roll (2) by means of a spindle (26) turned by a hand wheel (24).

In operation of this device a cheese strand (30), e.g., about 2 mm thick and 3 m wide, is applied in a known way to cooling roll (2). The release agent, e.g., alginate, comes from a supply tank (not shown) so it is heated and passed through distributor tube (6) through bores (8) onto applicator roll (4). If the release agent is not immediately distributed uniformly it is applied by applicator roll (10) in the form of a film with a uniform thickness. At the point of contact (32) between applicator (4) and cheese strand (30) the film detaches from applicator roll (4) and remains adhering to the outside of the cheese strand (30) as a film (34) of a uniform thickness.

Figure 2:
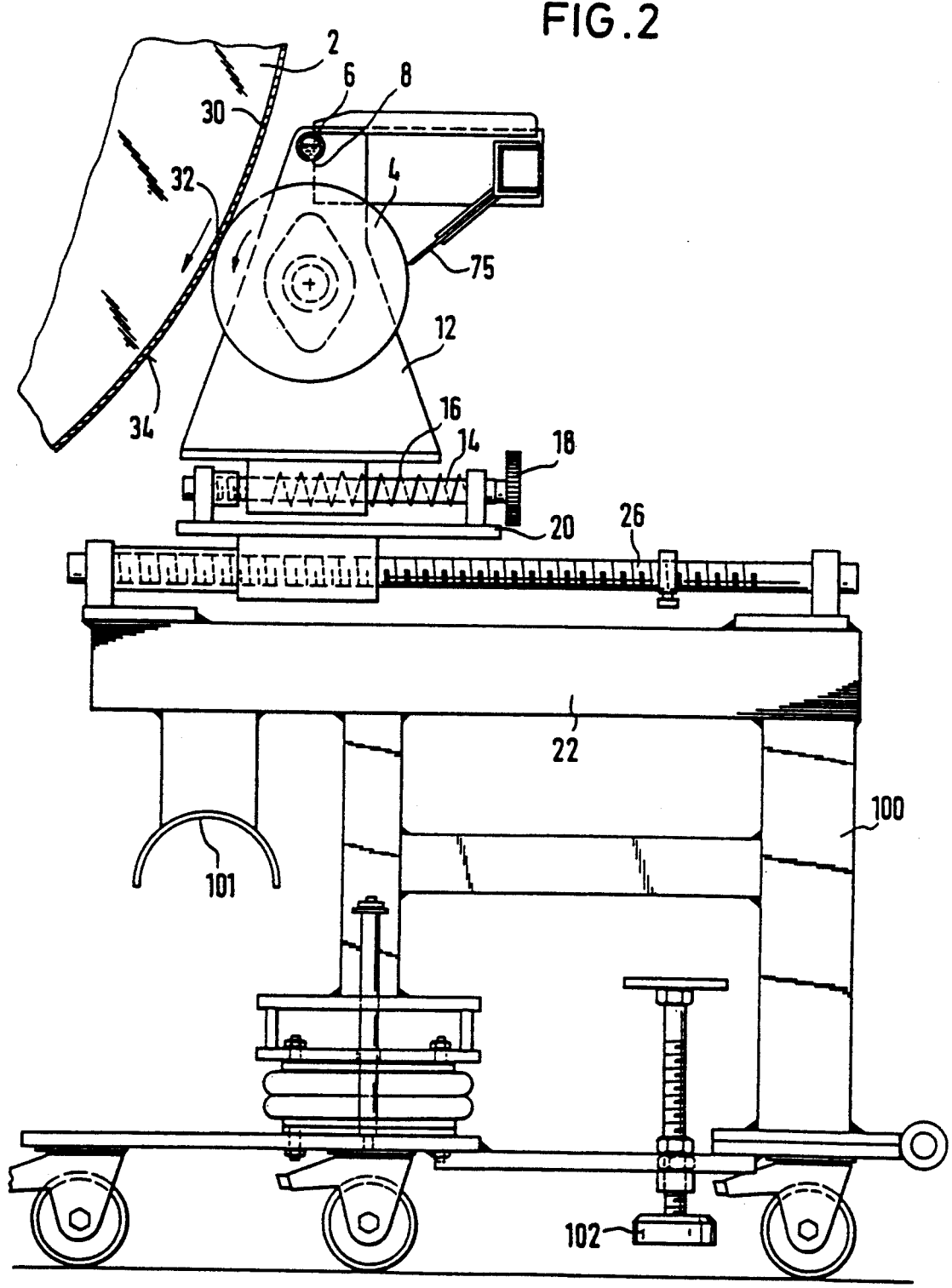
FIG. 2 shows another refinement of a second version in a diagram corresponding to FIG. 1.

The version according to FIG. 2 differs essentially from the version according to FIG. 1 in that distributor roll (10) is omitted and instead there is an adjustable stripper (75) positioned in front of distributor tube (6) in the direction of travel of the periphery of applicator roll (4) such that it can be applied to applicator roll (4). The stripper serves the function of stripping cold release agent that has not been applied to cheese strand (30) from applicator roll (4). Therefore it is adjusted to the peripheral areas of both sides of the cheese strand (30) to be processed. In this way, bacteriological reinfection due to cold release agent on the applicator roll is prevented.

Furthermore the version according to FIG. 2 actually shows an underframe (100) which is mounted on the bottom so it is aligned with cooling roll (2) and away from cooling roll (2). A plunger mounted on underframe (100) so it can be lowered serves this purpose. Underframe (100) has the correct position relative to cooling roll (2) when the contact points (101) and cup feet (102) on the two ends of underframe (100) are adjusted in such a way that cooling roll (2) and applicator roll (4) are aligned in parallel so they have the same gap width along the entire length.

What is claimed is:

1. An apparatus for performing the method of applying a liquid release agent onto a string of cheese, wherein the apparatus comprises: an applicator roll (4) for applying the release agent onto the cheese, a cooling roller (2) and a distribution tube (6), said distribution tube (6) resiliently presses the cheese between the applicator roll (4) and the cooling roll (2) and is above said applicator roll (4) and extends in longitudinal direction of said applicator roll (4), said distribution rube (6) having at least one row of downwardly directed out flow bores (8) for said release agent wherein, above said applicator roll (4) between said distribution tube (6) and said cooling roller (2), there is disposed a distributor (10) for the release agent flowing from the distributor tube (6) onto said applicator roll (4).

2. The apparatus of claim 1 wherein, said distributor (10) is a distributing roll (10).

3. The apparatus of claim 1 wherein a stripper (75) is located in front of the distributor tube (6) in the direction of movement of the periphery of said applicator roll (4) and adjustable relative to said applicator roll (4).

4. The apparatus of claim 3 wherein, said applicator roll (4), said distributor tube (6) and optionally, said distributor (10), as well as said stripper (75), is supported at or attached to a base support (12) which is pressed against said cooling roll (2) under adjustable spring pressure.

5. The apparatus of claim 4 wherein, said base support (12) is disposed on a carriage (20) which is adjustably movable on a frame (22) in the direction of the cooling roller (2) and away therefrom.

6. The apparatus of claim 5 wherein, said frame (22) is fixed to an understructure 100) movable towards and away from said cooling roller (2) and being in alignment opposite said cooling roller (2).

* * * * *